United States Patent
Okamoto et al.

(10) Patent No.: US 10,634,266 B2
(45) Date of Patent: Apr. 28, 2020

(54) PACKING

(71) Applicant: Yazaki Corporation, Tokyo (JP)

(72) Inventors: Kenichi Okamoto, Shizuoka (JP); Hikaru Oi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 9 days.

(21) Appl. No.: 16/005,573

(22) Filed: Jun. 11, 2018

(65) Prior Publication Data

US 2018/0363808 A1     Dec. 20, 2018

(30) Foreign Application Priority Data

Jun. 14, 2017  (JP) ................... 2017-116575

(51) Int. Cl.
  *F16L 5/10*   (2006.01)
  *F16J 15/02*  (2006.01)
  *H02G 3/22*   (2006.01)

(52) U.S. Cl.
  CPC ............. *F16L 5/10* (2013.01); *F16J 15/022* (2013.01); *H02G 3/22* (2013.01)

(58) Field of Classification Search
  CPC ...... F16L 5/10; H02G 3/22; F16J 15/02; F16J 15/021; F16J 15/022; F16J 15/10; F16J 15/104
  See application file for complete search history.

(56) References Cited

U.S. PATENT DOCUMENTS

| 3,472,523 | A  | * | 10/1969 | Carlson, Jr. | ............ | F16J 15/024 277/649 |
| 5,720,487 | A  | * | 2/1998  | Kato         | ............. | H01R 13/5205 277/637 |
| 7,883,365 | B2 | * | 2/2011  | Saitou       | ............. | H01R 13/5205 439/587 |
| 8,393,911 | B2 | * | 3/2013  | Aoki         | ............. | H01R 13/5205 439/272 |
| 2012/0058660 | A1 | | 3/2012 | Aoki et al.  | | |

FOREIGN PATENT DOCUMENTS

| JP | 2010-272405 A | 12/2010 |
| JP | 2014-160576 A |  9/2014 |

* cited by examiner

*Primary Examiner* — Gilbert Y Lee

(74) *Attorney, Agent, or Firm* — Kenealy Vaidya LLP

(57) ABSTRACT

An packing has an annular shape. The packing includes: a plurality of first protruding portions that protrude in a direction of enlarging a diameter from an outer peripheral surface of the annular shape to be continuous along a circumference and are arranged in parallel in an axial direction; a plurality of second protruding portions that protrude in a direction of reducing a diameter from an inner peripheral surface of the annular shape to be continuous along a circumference and are arranged in parallel in the axial direction with a parallel width wider than a parallel width with which the first protruding portions are arranged; and axially-protruding portions that are provided positions to sandwich the first protruding portion and the second protruding portion from both sides in the axial direction and protrude in the axial direction from both ends in the axial direction of the first protruding portion.

5 Claims, 3 Drawing Sheets

PACKING

CROSS-REFERENCE TO RELATED APPLICATION(S)

The present application claims priority to and incorporates by reference the entire contents of Japanese Patent Application No. 2017-116575 filed in Japan on Jun. 14, 2017.

BACKGROUND OF THE INVENTION

1. Field of the Invention

The present invention relates to a packing.

2. Description of the Related Art

A packing is conventionally used to prevent entry of moisture from the periphery of an electric wire passing through a partition wall. In general, the packing has an annular shape and serves to block water at a gap between the partition wall and the electric wire as an inner peripheral surface thereof is in close contact with the outer side of the electric wire, and an outer peripheral surface thereof is in close contact with the inner side of a hole formed in the partition wall.

The packing sometimes rolls and twists on surfaces of other members during assembly due to circumstances of being assembled such that the inner peripheral surface and the outer peripheral surface are in close contact with the other members. When the packing twists, it is difficult to obtain sufficient waterproof performance, and thus, it is necessary to perform the assembly again. Thus, conventionally, devices to make the packing hardly twist have been made.

Here, FIG. 5 is a cross-sectional view for describing a shape of a packing 510. A cutting direction of this imaginary cross section is a radial direction. The packing 510 is an example of a conventional packing. The packing 510 has waterproof mountains 511 and 512 and an axially-protruding portion 513. The waterproof mountain 511 protrudes in an annual shape from an outer peripheral surface of the packing 510, and a plurality of the waterproof mountains 511 are provided in parallel in a direction (axial direction) orthogonal to the radial direction of the packing 510. The waterproof mountain 512 protrudes in an annual shape from an inner peripheral surface of the packing 510, and a plurality of the waterproof mountains 512 are provided in parallel in the axial direction. The axially-protruding portion 513 is a portion that is extended to be wide in the axial direction of the packing 510.

The packing 510 is inserted into the hole of the partition wall in the state of being attached to the outside of the electric wire. At that time, the waterproof mountain 511 receives a force in the lateral direction (for example, the rightward direction) of the drawing due to friction against an inner peripheral surface of the hole. In this case, the packing 510 is likely to roll around the axis orthogonal to the sheet plane of the drawing (for example, the clockwise direction), but the rolling is prevented since the axially-protruding portion 513 extends to be wide in the axial direction.

However, the axially-protruding portion 513 is a structure configured to prevent the rolling during assembly and is irrelevant to water-blocking performance. When this axially-protruding portion 513 is provided, the use amount of materials increases so that cost increases as compared with a case where the axially-protruding portion 513 is not provided.

SUMMARY OF THE INVENTION

Therefore, an object of the present invention is to obtain cost reduction by reducing a structure irrelevant to the water-blocking performance in a packing.

In order to achieve the above mentioned object, an packing according to one aspect of the present invention has an annular shape and buries a gap between a hole provided in a partition wall and a member to be inserted into the hole, and includes a plurality of first protruding portions that protrude in a direction of enlarging a diameter from an outer peripheral surface of the annular shape to be continuous along a circumference, and are arranged in parallel in an axial direction; a plurality of second protruding portions that protrude in a direction of reducing a diameter from an inner peripheral surface of the annular shape to be continuous along a circumference, and are arranged in parallel in the axial direction with a parallel width wider than a parallel width with which the first protruding portions are arranged; and axially-protruding portions that are provided positions to sandwich the first protruding portion and the second protruding portion from both sides in the axial direction, and protrude in the axial direction from both ends in the axial direction of the first protruding portion.

According to another aspect of the present invention, in the packing, it is possible to configure that the second protruding portions are provided more than the first protruding portions.

According to still another aspect of the present invention, in the packing, it is possible to configure that the axially-protruding portion has an inclined surface toward an outer side in the axial direction from a vertex of the second protruding portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
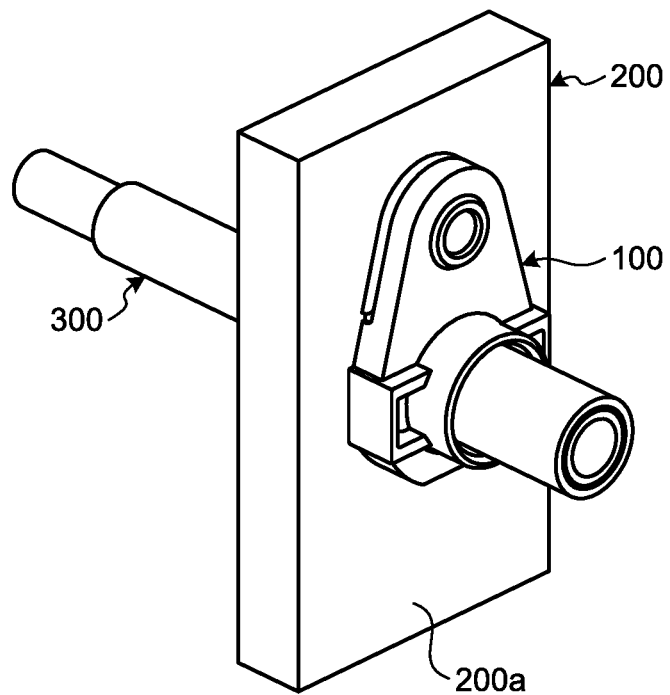
FIG. 1 is a perspective view illustrating the appearance of a shield connector according to an embodiment of the present invention.
Figure 2:
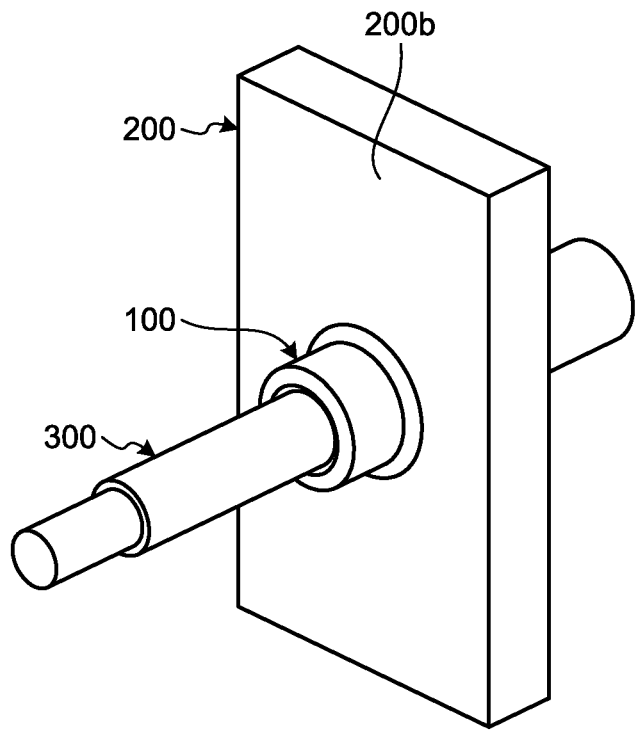
FIG. 2 is a perspective view illustrating the appearance of the shield connector from another direction.

Hereinafter, an embodiment of the present invention will be described with reference to the drawings. FIG. 1 is a perspective view illustrating the appearance of a shield connector 100. FIG. 2 is a perspective view illustrating the appearance of the shield connector 100 from another direction of FIG. 1.

The shield connector 100 holds an electric wire 300 passing through a partition wall 200 to be positionally immovable with respect to the partition wall 200, and seals a space between the partition wall 200 and the electric wire 300 to bock water. A surface on the back side of a surface 200a of the partition wall 200 seen in FIG. 1 is a surface 200b of the partition wall 200 seen in FIG. 2. For example, the partition wall 200 is a part of a device casing, the surface 200a is an outer surface of the device casing, and the surface 200b is an inner surface of the device casing.

Figure 3:
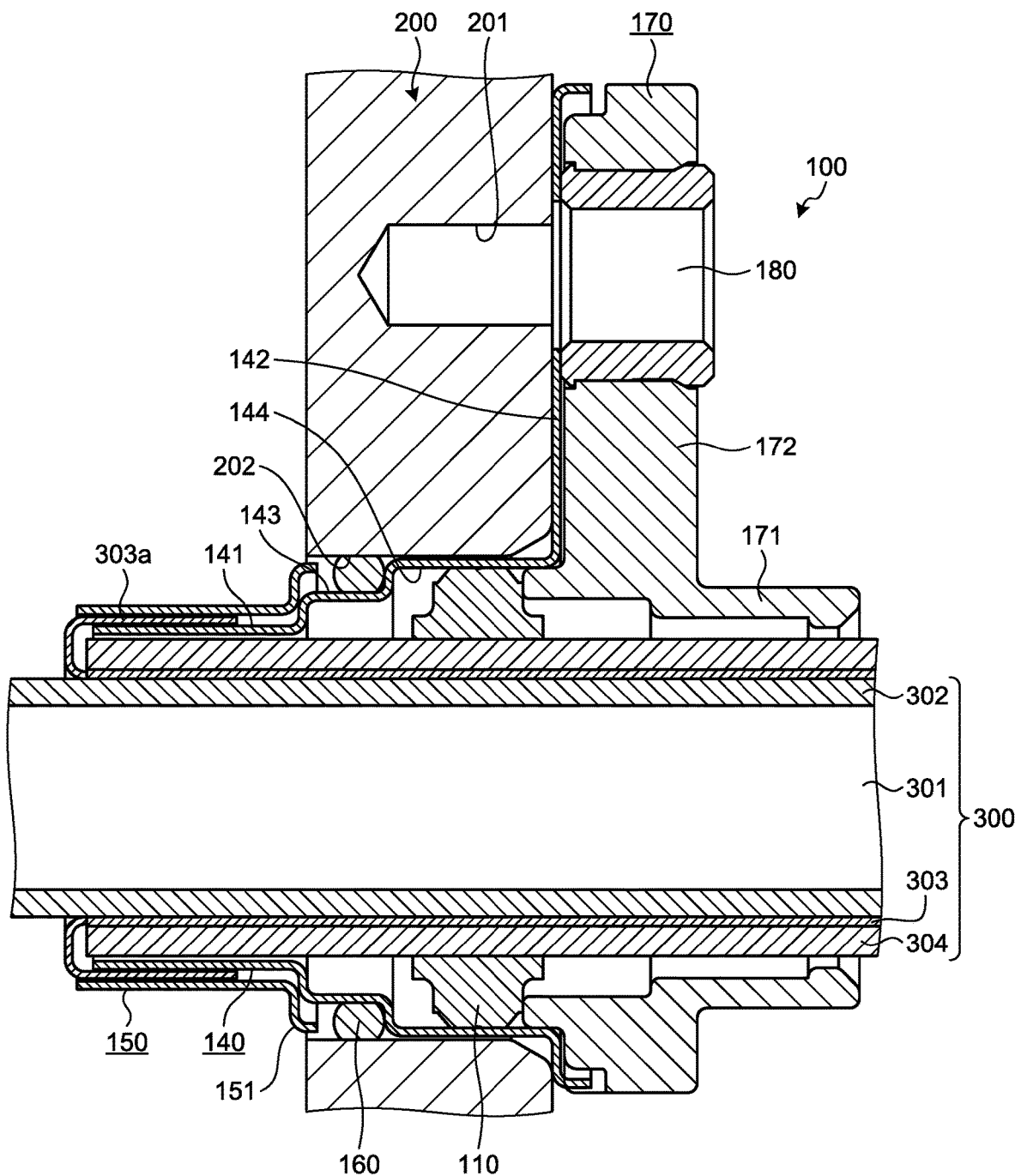
FIG. 3 is a cross-sectional view illustrating a structure of the shield connector.

FIG. 3 is a cross-sectional view illustrating a configuration of the shield connector 100. As illustrated in FIG. 3, the electric wire 300 is, for example, a shield electric wire, and includes a core wire 301, an inner covering body 302, a shield layer 303, and a sheath (an outer covering body) 304.

The core wire 301 is a portion that is made of a conductive material such as metal and realizes functions (for example, signal transmission/reception and power supply) that need to be performed by the electric wire 300.

The inner covering body 302 is made of an insulating material such as synthetic resin and covers the core wire 301 to insulate the core wire 301 from the shield layer 303.

The sheath 304 is the outermost covering of the electric wire 300 and prevents external damage to an inner member, entry of water into the internal portion. The sheath 304 is also called an external insulator and is made of an insulating material.

The shield layer 303 is a member that is made of metal (for example, copper or aluminum) covering the inner covering body 302. The shield layer 303 prevents entry and leakage of electromagnetic waves, electric fields, and magnetic fields to enhance communication reliability of the core wire 301. There are various types of the shield layer 303, such as a braided shield, a foil tape, a laterally-wound shield, and any suitable one is selected and used.

The shield connector 100 includes a packing 110, a shield terminal 140, a shield sleeve 150, an O-ring 160, a flange 170, and a collar 180.

The flange 170 has a cylindrical portion 171 and a flange portion 172. The cylindrical portion 171 has a hole through which the electric wire 300 passes. The flange portion 172 is a portion extending upward, for example, from the cylindrical portion 171 as illustrated in the appearance in FIG. 1, and has a hole configured to attach the shield connector 100 to the partition wall 200.

The collar 180 is a cylindrical member also called a bush, and is attached to the hole of the flange portion 172. A male screw that fixes the shield connector 100 to the partition wall 200 passes through a hole of the collar 180 and is screwed into a female screw 201 provided in the partition wall 200.

The shield terminal 140 is made of, for example, a conductive member such as metal, and has a cylindrical portion 141, a flange portion 142, a first step portion 143, and a second step portion 144.

The flange portion 142 has a shape corresponding to the flange portion 172 and is in contact with the outer surface 200a of the partition wall 200.

The cylindrical portion 141 is a portion through which the electric wire 300 passes, and passes through a hole 202 of the partition wall 200 and is positioned inside the device casing. A distal end portion of the cylindrical portion 141 is covered by a flipped and folded portion 303a of the shield layer 303. As a result, the shield layer 303 is electrically connected to the partition wall 200 via the shield terminal 140, and thus, the core wire 301 is covered by a ground so that a high frequency is prevented from going out to the outside.

The first step portion 143 and the second step portion 144 are portions between the cylindrical portion 141 and the flange portion 142. The first step portion 143 has a cylindrical shape having a larger diameter than the cylindrical portion 141, and the second step portion 144 has a cylindrical shape having a still larger diameter.

The O-ring 160 is attached to an outer peripheral surface of the first step portion 143. The O-ring 160 causes the first step portion 143 and the hole 202 of the partition wall 200 to be in close contact, thereby sealing a gap between the shield terminal 140 and the partition wall 200.

The packing 110 is an annular member formed using a non-conductive material having elasticity (for example, rubber or the like) and is also called a rubber stopper or the like. The packing 110 is attached to an outer peripheral surface of the electric wire 300 and is fitted to an inner peripheral surface of the second step portion 144. The packing 110 causes the second step portion 144 and the electric wire 300 to be in close contact, thereby sealing a gap between the shield terminal 140 and the electric wire 300.

The shield sleeve 150 is a cylindrical member that covers the outer periphery of the cylindrical portion 141 and presses the flipped and folded portion 303a of the shield layer 303 against an outer peripheral surface of an end of the cylindrical portion 141 for close contact therebetween. The shield sleeve 150 has an enlarged diameter portion 151 at an end close to the 0 ring 160 in an assembled state.

Figure 4:
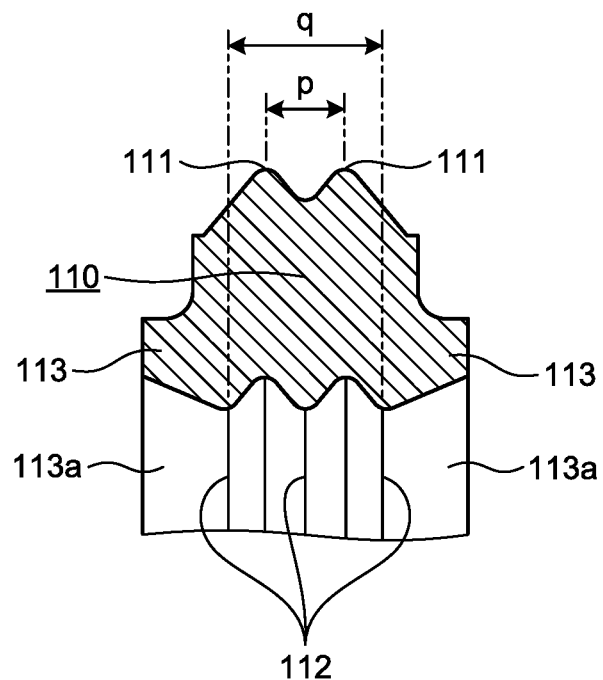
FIG. 4 is a cross-sectional view for describing a shape of a packing.

FIG. 4 is a cross-sectional view for describing a shape of the packing 110. A cutting direction of this imaginary cross section is a radial direction. The packing 110 has waterproof mountains 111 and 112 and an axially-protruding portion 113. The waterproof mountain 111 is an example of a first protruding portion, and the waterproof mountain 112 is an example of a second protruding portion.

The waterproof mountain 111 protrudes in a direction of enlarging the diameter from an outer peripheral surface of the packing 110 to be continuous along the circumference, and a plurality of the waterproof mountains 111 are provided in parallel in a direction orthogonal to the radial direction of the packing 110 (an axial direction or a width direction). The waterproof mountain 112 protrudes in a direction of reducing the diameter from an inner peripheral surface of the packing 110 to be continuous along the circumference, and a plurality of the waterproof mountains 112 are provided in parallel in the axial direction.

The axially-protruding portion 113 is a portion which protrudes to be short in the axial direction from both sides of the packing 110. More specifically, the axially-protruding portions 113 are parts that are provided at positions to sandwich the waterproof mountain 111 and the waterproof mountain 112 from both sides in the axial direction, and protrude in the axial direction from both ends in the axial direction of the waterproof mountains 111 and 112.

Figure 5:
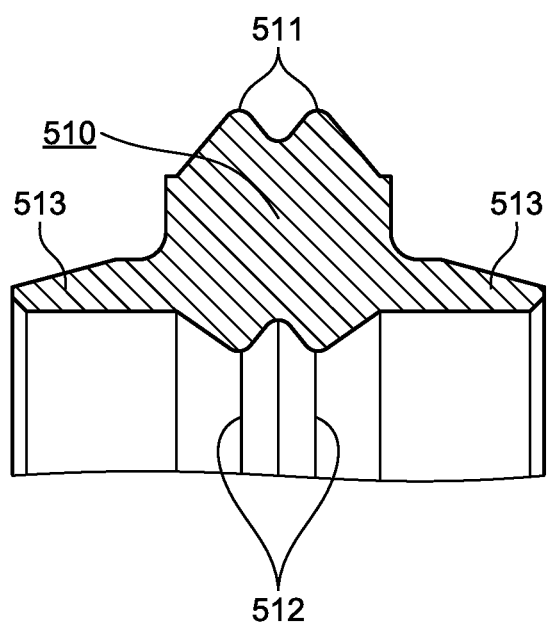
FIG. 5 is a cross-sectional view illustrating an example of a shape of a conventional packing.

Here, a description will be given through a comparison by referring to a packing 510 which is a conventional example illustrated in FIG. 5 for the sake of convenience of the description.

It is assumed that the conventional packing 510 is attached to the outer peripheral surface of the electric wire 300 instead of the packing 110 of the present embodiment and is inserted into the second step portion 144. In this case, an outer waterproof mountain 511 receives a force in the lateral direction (for example, the rightward direction) of FIG. 5 due to friction against the second step portion 144. Then, a force around the axis orthogonal to the sheet plane of the drawing (for example, the clockwise direction) acts on the packing 510. An axially-protruding portion 513 stops the packing 510 that attempts to roll due to such a force.

On the other hand, the packing 110 of the present embodiment has a different shape from the conventional packing 510, thereby realizing the prevention of rolling of the packing 110 without depending on the wide axially-protruding portion 513.

In the conventional packing 510, no particular difference is set between shapes of the outer waterproof mountain 511 and an inner waterproof mountain 512. In the packing 110 of the present embodiment, however, the outer waterproof mountain 111 and the inner waterproof mountain 112 have different shapes as follows.

First, a parallel width q between the inside waterproof mountains 112 is set to be wider than a parallel width p between the outer waterproof mountains 111. In addition, the inner waterproof mountains 112 are provided more than the outer waterproof mountains 111. In the specific example illustrated in FIG. 4, the three waterproof mountains 112 are provided although the two waterproof mountains 111 are provided.

Here, the above-described parallel width p is an interval between vertexes of the waterproof mountains 111, in other words, an axial dimension of a range where the vertexes exist. Similarly, the parallel width q is an interval between vertexes of the waterproof mountains 112, in other words, an axial dimension of a range where the vertexes exist. Since the number of the waterproof mountains 112 is three in the specific example illustrated in FIG. 4, a dimension of an interval along the axial direction of vertexes of the two waterproof mountains sandwiching the central waterproof mountain is the parallel width q.

In addition, a problem regarding rigidity of the packing 110 sometimes occurs if the parallel width q between the inside waterproof mountains 112 is just wider than the parallel width p, but weakness of the rigidity is reinforced if the inner waterproof mountains 112 are provided more than the outer waterproof mountains 111.

Further, a bottom surface 113a of the axially-protruding portion 113 is provided to be gently continuous from the waterproof mountain 112 in the packing 110. That is, the bottom surface 113a is an inclined surface that is inclined from the vertex of the waterproof mountain 112 toward an outer side in the axial direction of the packing 110. As a result, the bottom surface 113a effectively receives the lateral force received by the waterproof mountains 111 opposing each other with a central portion of the packing 110 sandwiched therebetween. In the conventional packing 510, the axially-protruding portion 513 is formed not in a shape to cooperate with the waterproof mountain 512 but to prevent the rolling alone, and thus, needs to have the shape that is extended to be wide the axial direction.

In this manner, according to the packing 110 of the present embodiment, it is possible to realize the rolling prevention during assembly without depending on the large axially-protruding portion 513 which as conventionally requires a lot of materials. As a result, it is possible to reduce the use amount of materials and to reduce the cost. In addition, it is possible to decrease the width (that is, the axial dimension) of the packing 110, and thus, it is possible to mitigate restriction on a shape of an attachment portion of the packing 110. Further, the packing 110 is not wide, and thus, is easily attached to the electric wire 300.

According to the packing of the present embodiment, it is possible to reduce the structure irrelevant to the water-blocking performance and to obtain the cost reduction. That is, it is configured such that it is possible to realize rolling prevention during assembly without depending on a large axially-protruding portion, which requires a large amount of materials, and thus, it is possible to suppress the use amount of materials and to reduce the cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A packing having an annular shape and burying a gap between a hole provided in a partition wall and a member to be inserted into the hole, the packing comprising:
   a plurality of first protruding portions that protrude in a direction of enlarging a diameter from an outer peripheral surface of the annular shape to be continuous along a circumference, and are arranged in parallel in an axial direction;
   a plurality of second protruding portions that protrude in a direction of reducing a diameter from an inner peripheral surface of the annular shape to be continuous along a circumference, and are arranged in parallel in the axial direction with a parallel width wider than a parallel width with which the first protruding portions are arranged; and
   axially-protruding portions that are provided positions to sandwich the first protruding portions and the second protruding portions from both sides in the axial direction, and protrude in the axial direction from both ends in the axial direction of the first protruding portions, wherein
   in the axial direction, all of the first protruding portions are sandwiched between two of the second protruding portions located at both ends in the axial direction among the second protruding portions, and
   each of the axially-protruding portions has an inclined surface toward an outer side in the axial direction that extends from a vertex of a respective one of the second protruding portions located at the both ends.

2. The packing according to claim 1, wherein
the second protruding portions are provided more than the first protruding portions.

3. The packing according to claim 1, wherein
the axially-protruding portions are symmetrical to each other in the axial direction.

4. The packing according to claim 1, wherein
the packing is symmetrical in the axial direction.

5. The packing according to claim 1, wherein
each of the axially-protruding portions includes an outer circumferential surface, and
the inclined surface extends towards the outer circumferential surface.

* * * * *